US006918549B2

(12) United States Patent
Theodorof

(10) Patent No.: US 6,918,549 B2
(45) Date of Patent: Jul. 19, 2005

(54) FUEL INJECTOR TIP FOR CONTROL OF FUEL DELIVERY

(75) Inventor: Vladimir Theodorof, Bloomington, IL (US)

(73) Assignee: Caterpillar Inc, Peoria, IL (US)

( * ) Notice: Subject to any disclaimer, the term of this patent is extended or adjusted under 35 U.S.C. 154(b) by 151 days.

(21) Appl. No.: 10/419,394

(22) Filed: Apr. 21, 2003

(65) Prior Publication Data

US 2003/0192957 A1 Oct. 16, 2003

Related U.S. Application Data

(63) Continuation-in-part of application No. 10/036,965, filed on Dec. 21, 2001, now abandoned.

(51) Int. Cl.[7] .................... F02M 59/00; F02M 39/00; B05B 1/30
(52) U.S. Cl. .................. 239/533.3; 239/533.2; 239/533.12; 239/585.3; 239/585.5; 239/88
(58) Field of Search .............. 239/533.3, 533.2, 239/533.12, 533.9, 585.1–585.5, 88–92; 251/129.15, 129.21, 127

(56) References Cited

U.S. PATENT DOCUMENTS 5,029,759 A * 7/1991 Weber ................. 239/533.12
5,037,031 A * 8/1991 Campbell et al. ......... 239/533.3
5,392,745 A * 2/1995 Beck ........................ 123/295
5,899,389 A * 5/1999 Pataki et al. ............. 239/533.2
6,029,913 A * 2/2000 Stroia et al. ........... 239/533.12

FOREIGN PATENT DOCUMENTS

GB        2198785 A * 6/1988 .......... F02M/61/06

* cited by examiner

Primary Examiner—Davis Hwu
(74) Attorney, Agent, or Firm—Liell & McNeil

(57) ABSTRACT

An apparatus and method for injecting fuel into a cylinder of an engine which includes a fuel injector and a tip located on the fuel injector. The tip and fuel injector are located about a common longitudinal axis and includes a sac portion having a sac chamber, an outer sac surface, and at least one nozzle passage extending from an inner end located in the sac chamber to an outer end located at the outer sac surface, the at least one nozzle passage being at a fixed angle from the longitudinal axis along a central axis. The tip also includes an end surface located substantially adjacent to and parallel with the at least one nozzle passage and extending beyond the outer end of the at least one nozzle passage, and a curvilinear surface located on at least one of the end surface and the outer sac surface and configured such that a portion of fuel being injected through the at least one nozzle passage is directed to follow the curvilinear surface away from the central axis.

12 Claims, 6 Drawing Sheets

Fig_4

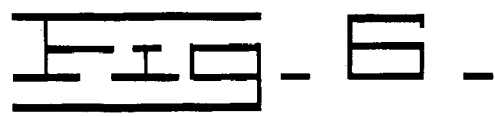
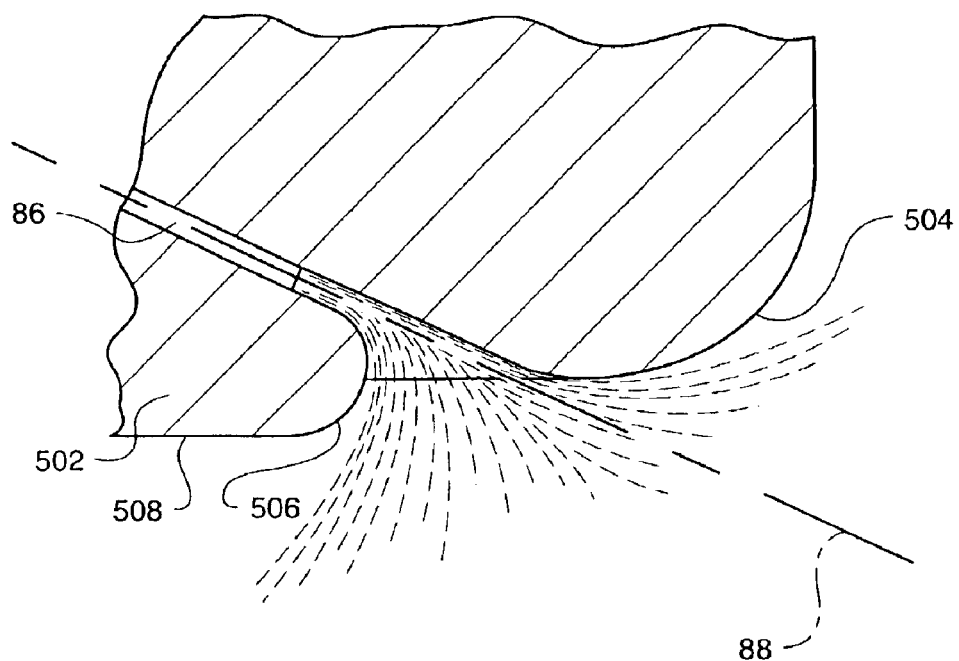

FUEL INJECTOR TIP FOR CONTROL OF FUEL DELIVERY

This application is a continuation-in-part of application Ser. No. 10/036,965, filed on Dec. 21, 2001 now abandoned.

TECHNICAL FIELD

This invention relates generally to a fuel injector for an internal combustion engine and more specifically to a tip for a fuel injector for controlling delivery of fuel.

BACKGROUND

Manufacturers of internal combustion engines are continuously attempting to improve the efficiency and emissions output of internal combustion engines. In diesel engines, a large amount of research has been done to reduce NOx output of an engine, through the use of improved fuel injectors and injection control. An injector tip typically includes a sac portion defined by an internal nozzle chamber and an exterior portion protruding from the end of the tip. A plurality of nozzle passages extend from a sac chamber through the sac to an outer sac wall. High pressure fuel is forced into the sac chamber, which is then sprayed into a combustion chamber. Often the spray of fuel does not mix evenly with combustion air within the combustion chamber. This creates uneven temperatures within the combustion chamber and causes inconsistent burning, resulting in emissions fluctuations.

In efforts to improve combustion and reduce emissions, tip geometry may be altered to improve atomization and distribution of the spray pattern within the combustion chamber. An improved spray distribution increases mixing of fuel and combustion air, in turn creating more evenly distributed temperatures throughout the combustion chamber.

Many manufacturers have altered geometry of injector tips in efforts to improve efficiency and emissions of engines. U.S. Pat. No. 4,106,702 issued to Gardner et al. illustrates a common tip and nozzle arrangement. Although designs similar to this are still being used, attempts to improve distribution of fuel spray in the combustion cylinder continue.

The present invention is directed to overcoming one or more of the above identified problems.

SUMMARY OF THE INVENTION

In one aspect of the present invention a tip for a fuel injector is disclosed. The tip and fuel injector are located about a common longitudinal axis and includes a sac portion having a sac chamber, an outer sac surface, and at least one nozzle passage extending from an inner end located in the sac chamber to an outer end located at the outer sac surface, the at least one nozzle passage being at a fixed angle from the longitudinal axis along a central axis. The tip also includes an end surface located substantially adjacent to and parallel with the at least one nozzle passage and extending beyond the outer end of the at least one nozzle passage, and a curvilinear surface located on at least one of the end surface and the outer sac surface and configured such that a portion of fuel being injected through the at least one nozzle passage is directed to follow the curvilinear surface away from the central axis.

In another aspect of the present invention a fuel injector having an upper end and a lower end and a tip located at the lower end is disclosed. The fuel injector and tip are located about a common longitudinal axis and includes a sac portion on the tip. The sac portion includes a sac chamber, an outer sac surface, and at least one nozzle passage extending from an inner end located in the sac chamber to an outer end located at the outer sac surface, the at least one nozzle passage being at an angle less than ninety degrees from the longitudinal axis at the lower end, the at least one nozzle passage extending along a central axis. The fuel injector also includes an end surface located substantially adjacent to and parallel with the at least one nozzle passage and extending beyond the outer end of the at least one nozzle passage, and a curvilinear surface located on at least one of the end surface and the outer sac surface and configured such that a portion of fuel being injected through the at least one nozzle passage is directed to follow the curvilinear surface away from the central axis.

In yet another aspect of the present invention a method for injecting fuel into a cylinder of an engine is disclosed. The method includes the steps of providing pressurized fuel to a sac chamber, delivering at least a portion of the fuel through at least one nozzle passage extending from an inner end located in the sac chamber to an outer end located at an outer sac surface, injecting the fuel from the outer end of the at least one nozzle passage into the cylinder along a direction of a central axis, and diverting a portion of the injected fuel to follow at least one curvilinear surface away from the central axis.

BRIEF DESCRIPTION OF THE DRAWINGS

FIG. 6 is a further enlarged partial diagrammatic sectional illustration of one nozzle passage of the injector tip embodied in FIG. 5.

DETAILED DESCRIPTION

Figure 1:
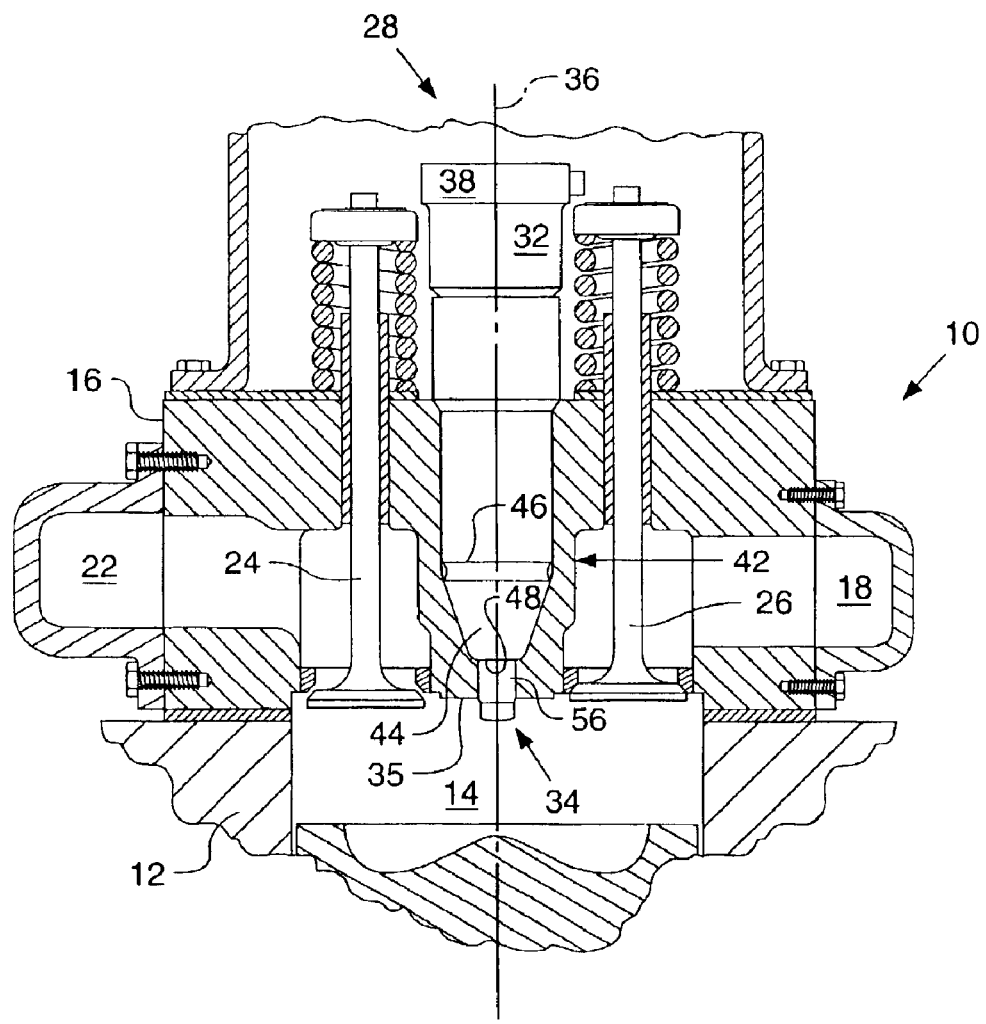
FIG. 1 is a diagrammatic sectional illustration of an internal combustion engine employing the present invention.

Referring to FIG. 1, an engine 10 includes a block 12 having a plurality of cylinders 14 therein, of which only one is shown. A cylinder head 16 mounted on the block 12 includes an exhaust passage 18 and an intake passage 22. An intake valve 24 is interposed between the intake passage 22 and the cylinder 14. An exhaust valve 26 is interposed between the exhaust passage 18 and the cylinder 14. A fuel injector 28 having a body 32 and an injector tip 34 is additionally positioned within the cylinder head 16. The injector tip 34 protrudes slightly below a surface 35 of the cylinder head 16. The fuel injector 28 may be of conventional construction, such as the type used with a hydraulically actuated electronically controlled unit injector system.

The fuel injector 28 is defined about a longitudinal axis 36. The body 32 may include an upper end 38, and a lower end 42 adapted to receive an attachment sleeve 44. The attachment sleeve 44 may define a substantially cylindrical member having an open end 46 and a partially open end 48, opposite the open end 46. The injector tip 34 may be positioned within the attachment sleeve 44, such that a portion of the tip 34 protrudes from the attachment sleeve 44. The attachment sleeve 44, in turn, may be secured to the lower end 42 of the body 32.

Figure 2:
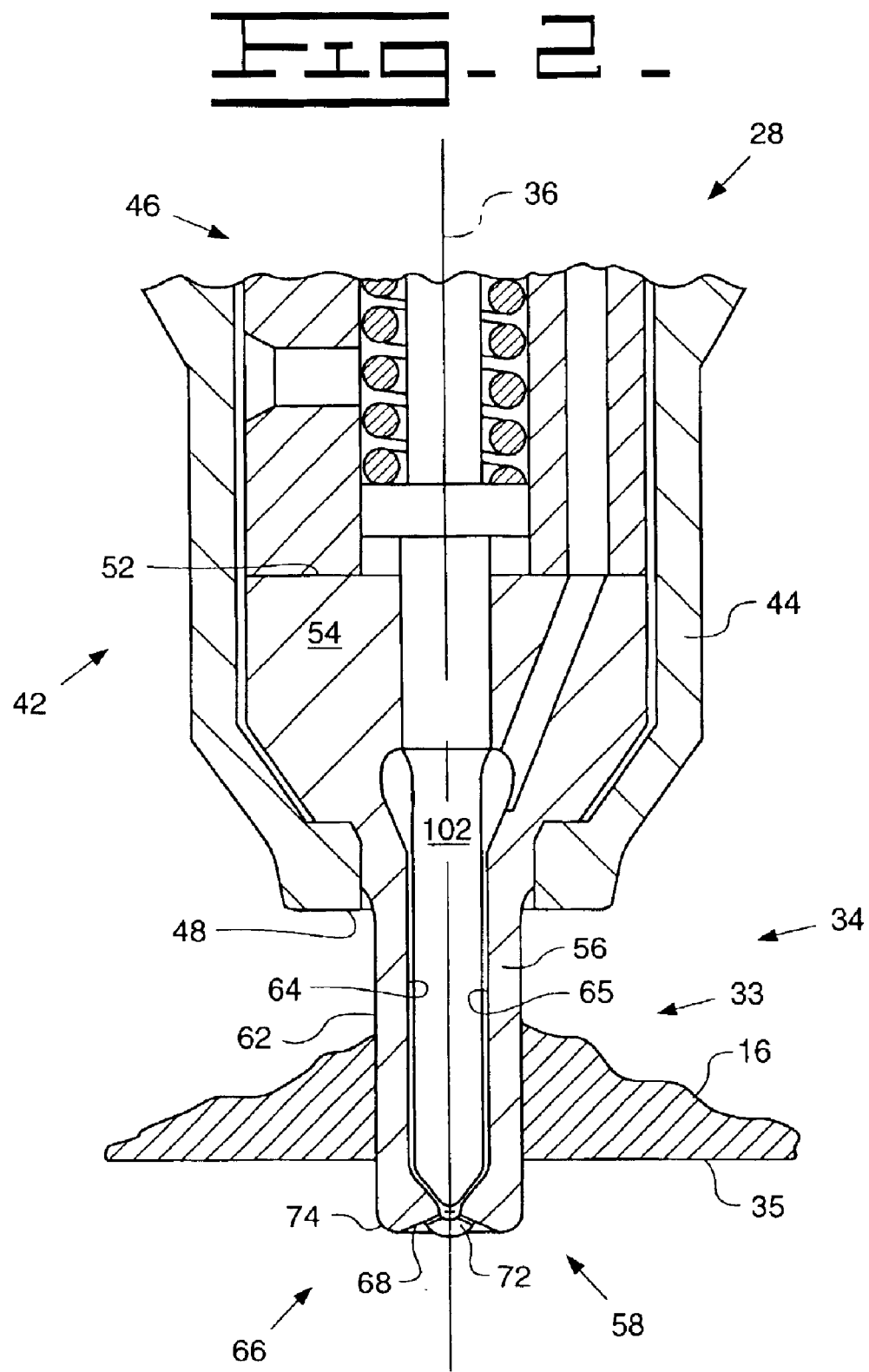
FIG. 2 is an enlarged diagrammatic sectional illustration of an embodiment of an injector tip of the present invention.

Referring now to FIG. 2, the injector tip 34 is shown attached to the lower end 42 of the fuel injector 28. The injector tip 34 may include a substantially cylindrical member 33 disposed about the longitudinal axis 36. A first end 52 of the injector tip 34 may include a shoulder portion 54 that is received by the attachment sleeve 44. A barrel 56 may extend from the shoulder portion 54 toward a second end 58 of the injector tip 34. The barrel 56 may include an outer wall 62 that extends to the second end 58. A cavity 64 defining an inner wall 65 may be disposed about the longitudinal axis 36, opening at the first end 52 and extending toward the second end 58.

An end portion 66 may be disposed at the second end 58 of the injector tip 34. The end portion 66 may include an end surface 68 and a sac portion 72. The end surface 68 may be disposed about the longitudinal axis 36 and extends radially outward to the outer wall 62. A curvilinear surface 74 may be interposed between the end surface 68 and the outer wall 62 of the injector tip 34. An intersection 76 (shown in FIG. 3) is defined at the junction of the end surface 68 and the outer wall 62. An angle 78 is defined between the end surface 68 and the longitudinal axis 36. Measuring the angle 78 from a point between the first end 52 and the end surface 68, an obtuse angle may be defined.

Figure 3:
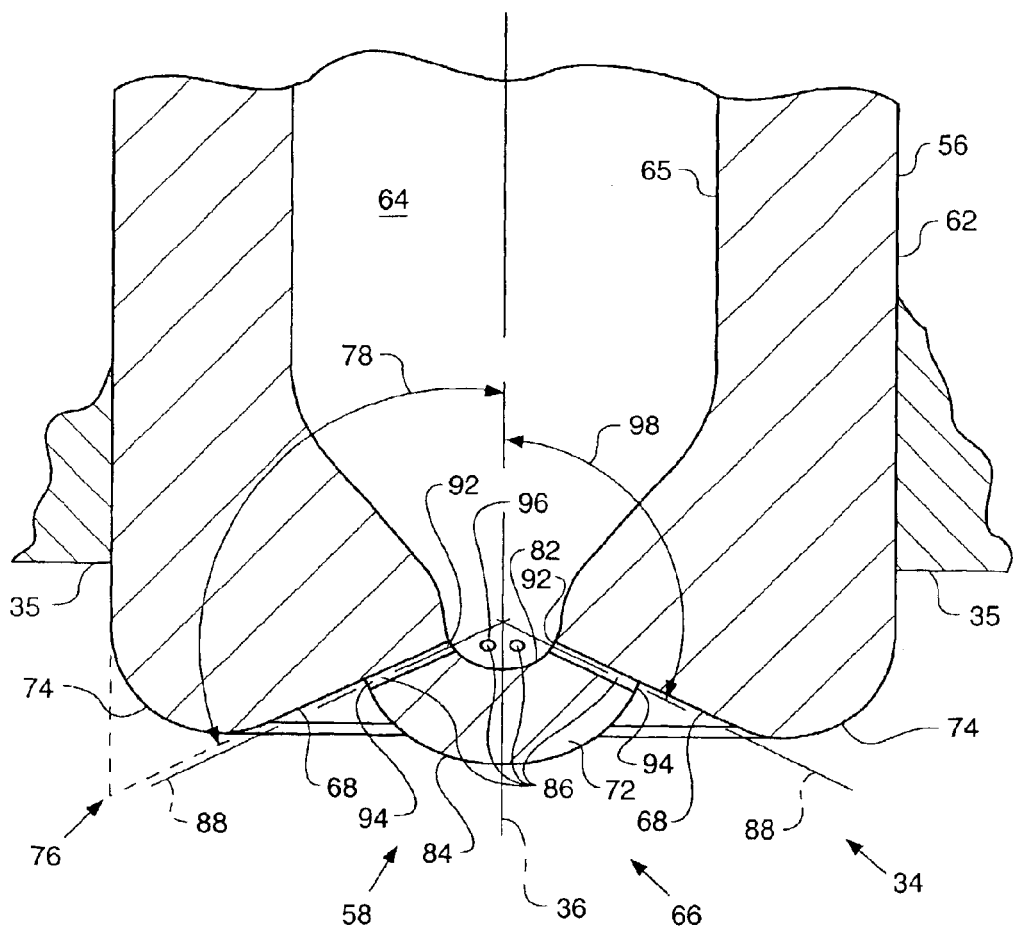
FIG. 3 is an enlarged partial diagrammatic sectional illustration of the injector tip of FIG. 2.

Referring now to FIG. 3, the sac portion 72 may include a sac chamber 82, an outer sac surface 84 and a plurality of nozzle passages 86. The sac chamber 82 may join the cavity 64 near the end portion 66. The outer sac surface 84 may be spherical in shape and disposed a predetermined distance from the sac chamber 82. The plurality of nozzle passages 86 each may include a central axis 88, an inner end 92 joining the sac chamber 82, and an outer end 94 at the outer sac surface 84. A perimeter 96 may be defined about the outer end 94 of each nozzle passage 86. A second angle 98 may be defined between the longitudinal axis 36 and the central axis 88 of each nozzle passage 86. The second angle 98 may be substantially equal to the first predetermined angle 78. The nozzle passage 86 may be adapted to spray high pressure fuel in an outward pattern, or plume.

A needle valve 102 is moveably positioned within the cavity 64. The needle valve 102 may be moveable between a first position and a second position, as shown in FIG. 2. In the first position, the needle valve 102 may permit fluid flow from the cavity 64, through the nozzle passages 86, and into the cylinder 14. In the second position, the needle valve 102 may block fluid flow from the cavity 64.

Figure 5:
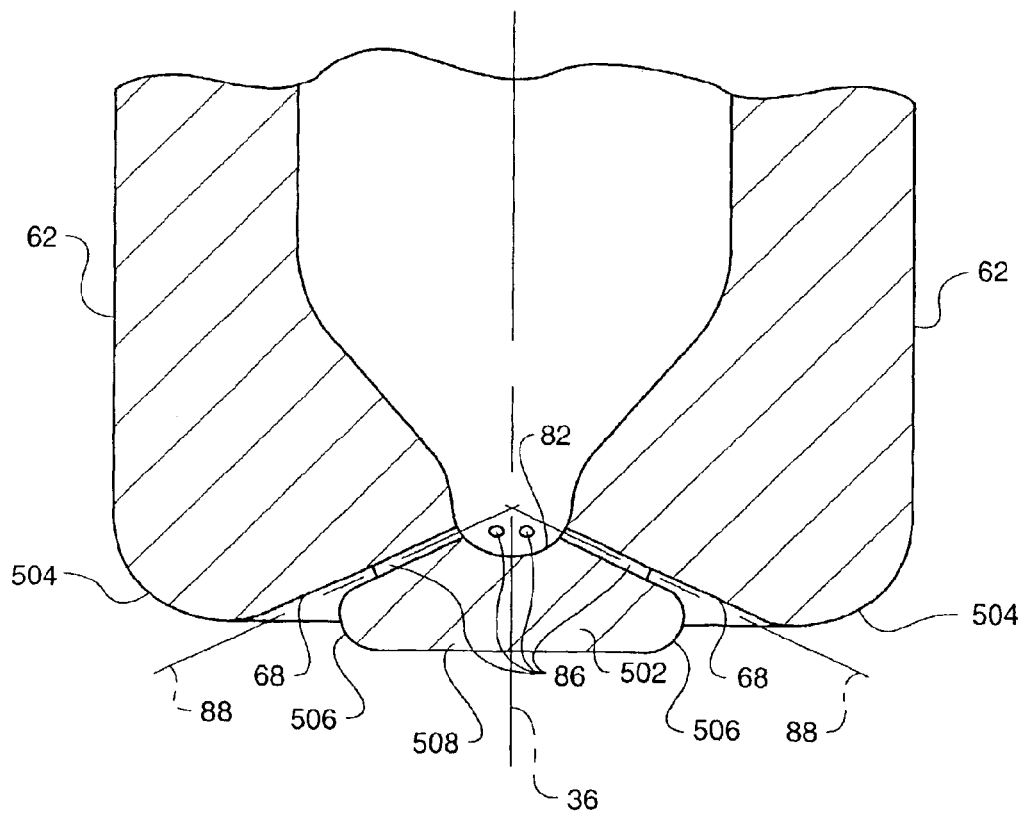
FIG. 5 is an enlarged partial diagrammatic sectional illustration of another embodiment of the injector tip of FIG. 2.

Referring to FIG. 5, an alternate embodiment sac portion 502 is shown. The sac portion 502 includes a sac chamber 82 and a plurality of nozzle openings 86, as shown in FIG. 3. The sac portion 502 also includes an outer sac surface 508 having a shape different from the spherical shape of the outer sac surface 84 of FIG. 3. It is noted that the shape of the outer sac surface 508 of FIG. 5 is exemplary and may vary from the shape which is shown.

A first curvilinear surface 504, corresponding to the curvilinear surface 74 of FIGS. 2 and 3, may be interposed between the end surface 68 and the outer wall 62. A second curvilinear surface 506 may be located along the outer sac surface 508, for example near the end surface 68. The first and second curvilinear surfaces 504, 506 may be oriented to curve away from the central axis 88.

INDUSTRIAL APPLICABILITY

In operation, the fuel injector tip 34 of the present invention provides improved distribution of fuel within the engine cylinder 14. High pressure fuel is supplied to the cavity 64 of the fuel injector tip 34 in a conventional manner. When the needle valve 102 is moved to the first position, fuel flows from the sac chamber 82 through the nozzle passages 86 and sprays into the cylinder 14. Action of the high pressure fuel passing through the nozzle passages 86 causes the fuel to atomize into a fine mist or spray. The fuel spray is in very close proximity to the end surface 68 of the injector tip 34.

A well known physical principle, the "Coanda Effect", illustrates that a stream of fluid flowing from a nozzle along a solid surface tends to follow the solid surface. This principle is consistent even though the surface may curve slightly from the stream.

Figure 4:
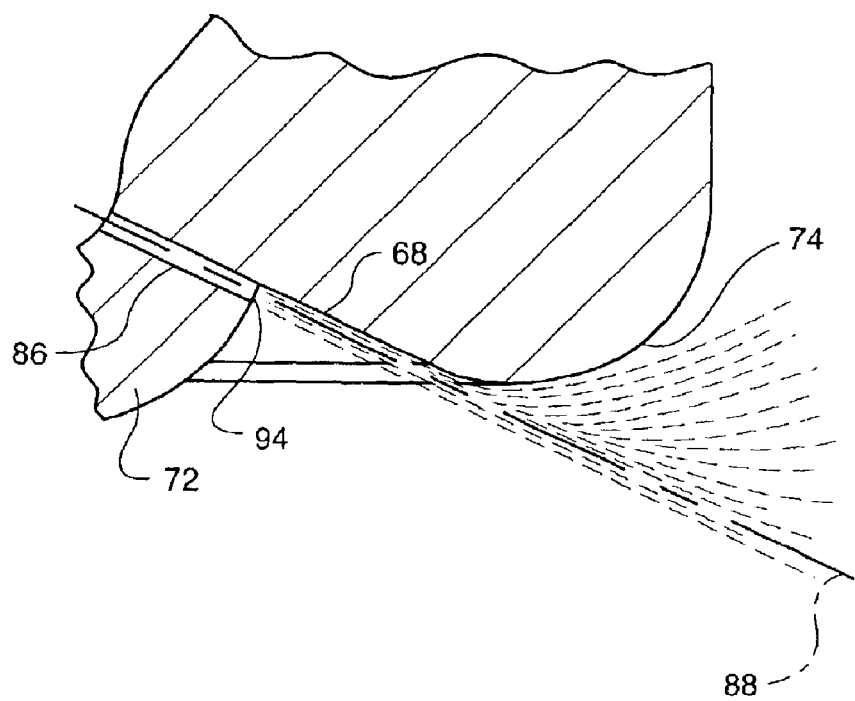
FIG. 4 is a further enlarged partial diagrammatic sectional illustration of one nozzle passage of the injector tip of FIGS. 2 and 3.

Referring to FIG. 4, an enlarged diagrammatic illustration showing a portion of a nozzle passage 86 of FIG. 3 depicts a typical flow of fuel through the nozzle passage 86.

Because of the "Coanda Effect", as fuel exits nozzle passage 86, a portion of the spray nearest the end surface 68 follows that surface. That portion of spray travels not only in the direction of the nozzle passages 86, but is directed along the curvilinear surface 74 away from the central axis 88. By directing a portion of the fuel spray away from the central axis 88, greater fuel distribution and mixing of fuel and combustion air may be achieved.

Referring to FIG. 6, an enlarged diagrammatic illustration showing a portion of a nozzle passage 86 of FIG. 5 depicts a typical flow of fuel through the nozzle passage 86. As fuel exits nozzle passage 86, a portion of the spray nearest the end surface 68 follows that surface. That portion of spray travels not only in the direction of the nozzle passages 86, but is directed along the first curvilinear surface 504 away from the central axis 88. In addition, a portion of the spray nearest the outer sac surface 508 follows that surface. More specifically, the portion of the fuel spray nearest the second curvilinear surface 506 is directed along the second curvilinear surface 506 away from the central axis 88 in a direction opposite the portion of fuel spray being directed along the first curvilinear surface 504.

Other aspects, objects and advantages of this invention can be obtained from study of the drawings, disclosure and the appended claims.

What is claimed is:

1. A tip for a fuel injector, the tip and fuel injector being located about a common longitudinal axis, comprising:
    a sac portion having a sac chamber, an outer sac surface, and at least one nozzle passage extending from an inner end located in the sac chamber to an outer end located at the outer sac surface, the at least one nozzle passage being at a fixed angle from the longitudinal axis along a central axis;
    an end surface located substantially adjacent to and parallel with the at least one nozzle passage and extending beyond the outer end of the at least one nozzle passage; and
    a curvilinear surface located on at least one of the end surface and the outer sac surface and configured such that a portion of fuel being injected through the at least one nozzle passage is directed to follow the curvilinear surface away from the central axis.

2. A tip, as set forth in claim 1, wherein the at least one nozzle passage includes a plurality of nozzle passages.

3. A tip, as set forth in claim 1, wherein the curvilinear surface is located on the end surface and curves away from both the central axis and the longitudinal axis.

4. A tip, as set forth in claim 1, wherein the curvilinear surface is located on the outer sac surface and curves away from the central axis and toward the longitudinal axis.

5. A tip, as set forth in claim 1, wherein the curvilinear surface includes:
   a first curvilinear surface located on the end surface and curving away from both the central axis and the longitudinal axis; and
   a second curvilinear surface located on the outer sac surface and curving away from the central axis and toward the longitudinal axis.

6. A fuel injector having an upper end and a lower end and a tip located at the lower end, the fuel injector and tip being located about a common longitudinal axis, comprising:
   a sac portion on the tip, the sac portion including:
      a sac chamber;
      an outer sac surface; and
      at least one nozzle passage extending from an inner end located
   in the sac chamber to an outer end located at the outer sac surface, the at least one nozzle passage being at an angle less than ninety degrees from the longitudinal axis at the lower end, the at least one nozzle passage extending along a central axis;
      an end surface located substantially adjacent to and parallel with the at least one nozzle passage and extending beyond the outer end of the at least one nozzle passage; and
      a curvilinear surface located on at least one of the end surface and the outer sac surface and configured such that a portion of fuel being injected through the at least one nozzle passage is directed to follow the curvilinear surface away from the central axis.

7. A fuel injector, as set forth in claim 6, wherein the curvilinear surface includes at least one of:
   a first curvilinear surface located on the end surface and curving away from both the central axis and the longitudinal axis; and
   a second curvilinear surface located on the outer sac surface and curving away from the central axis and toward the longitudinal axis.

8. A method for injecting fuel into a cylinder of an engine, comprising the steps of:
   providing pressurized fuel to a sac chamber;
   delivering at least a portion of the fuel through at least one nozzle passage extending from an inner end located in the sac chamber to an outer end located at an outer sac surface;
   injecting the fuel from the outer end of the at least one nozzle passage into the cylinder along a direction of a central axis, and along an end surface substantially adjacent the outer end of the at least one nozzle passage and parallel the central axis; and
   diverting a portion of the injected fuel to follow at least one curvilinear surface away from the central axis.

9. A method, as set forth in claim 8, wherein diverting a portion of the injected fuel includes the steps of:
   diverting a first portion of injected fuel to follow a first curvilinear surface; and
   diverting a second portion of injected fuel to follow a second curvilinear surface.

10. A method, as set forth in claim 9, wherein diverting a portion of the injected fuel includes the steps of:
   diverting the first portion of injected fuel away from the central axis and away from a longitudinal axis; and
   diverting the second portion of injected fuel away from the central axis and toward the longitudinal axis.

11. A method, as set forth in claim 8, wherein diverting a portion of the injected fuel includes the step of diverting a portion of injected fuel to follow a curvilinear surface away from the central axis and away the longitudinal axis.

12. A method, as set forth in claim 8, wherein diverting a portion of the injected fuel includes the step of diverting a portion of injected fuel to follow a curvilinear surface away from the central axis and toward the longitudinal axis.

* * * * *